Figure 1:
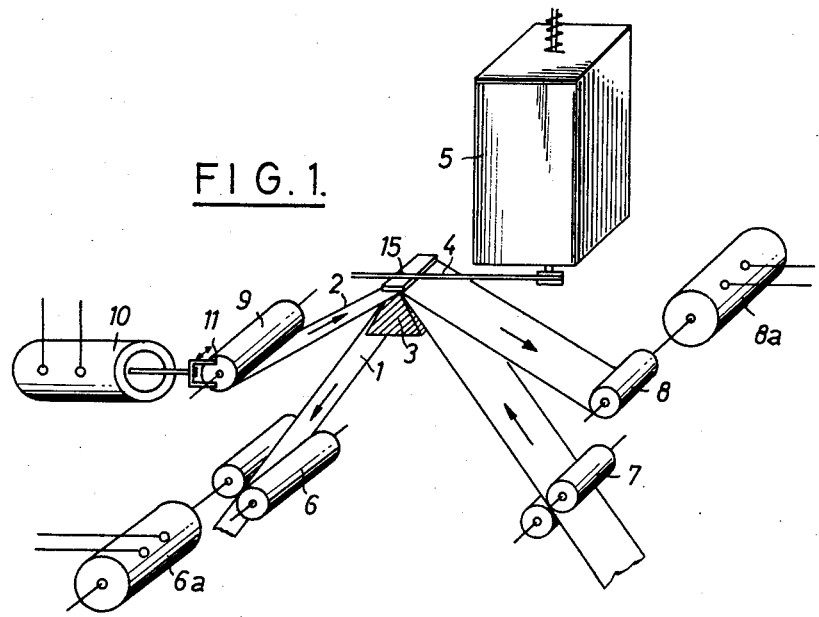

July 31, 1962     J. A. SCHAEDER     3,047,865

DIRECTLY REGISTERING RECORDING APPARATUS

Filed Dec. 1, 1959     2 Sheets-Sheet 1

INVENTOR
Johann Albrecht Schaeder

By

Attorney

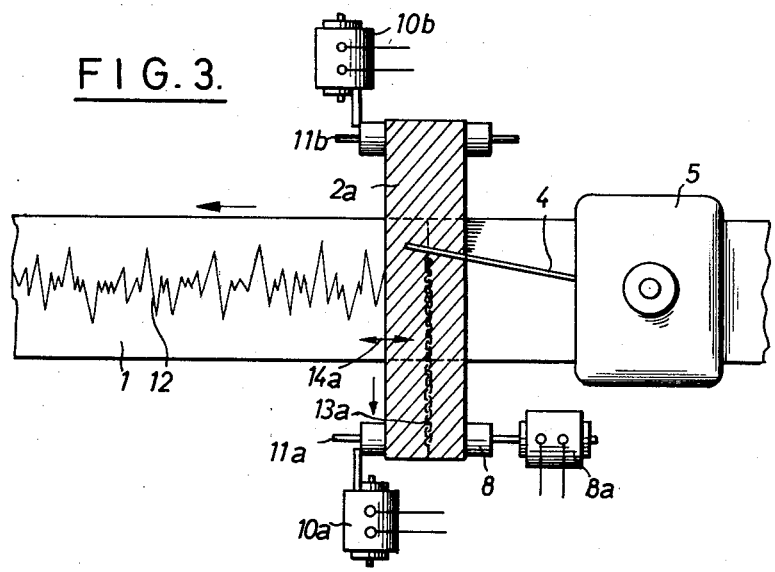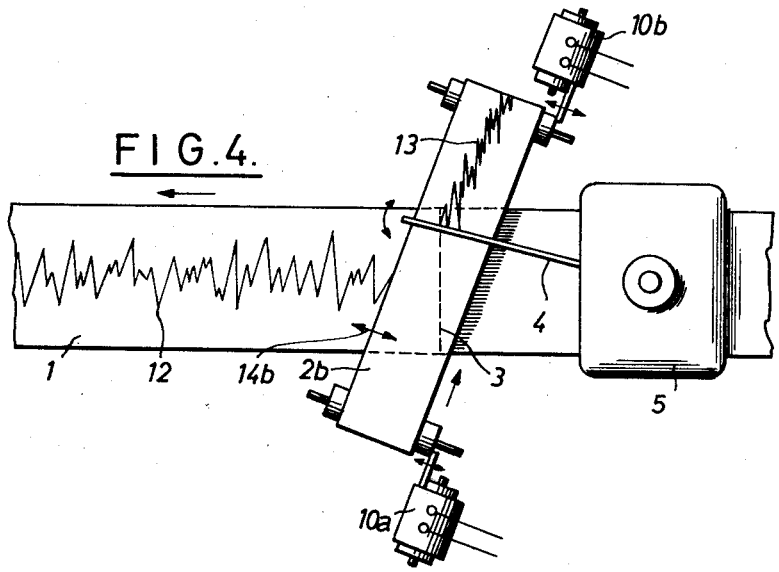

United States Patent Office 3,047,865
Patented July 31, 1962

3,047,865
DIRECTLY REGISTERING RECORDING APPARATUS
Johann Albrecht Schaeder, Merzhausen, near Freiburg im Breisgau, Germany, assignor to Fritz Hellige & Co. G.m.b.H., Freiburg im Breisgau, Germany, a company of Germany
Filed Dec. 1, 1959, Ser. No. 856,619
Claims priority, application Germany Dec. 3, 1958
9 Claims. (Cl. 346—69)

The present invention relates to directly registering recording apparatus such as that which is suitable for recording technical, scientific and particularly biological and medical data (e.g. electrocardiographs and electro-encephalographs).

In known directly registering recording apparatus, directly visible continuous registration of measurements is achieved by the transference of a dry pigment tracing from a pigment or colour carrier, such as a strip of carbon paper, to a strip-form record carrier under the pressure of a recording arm deflected by the action of measuring impulses or signals. Such recording mechanisms to an increasing extent are taking the place of the previously more generally used photographic recording apparatus and ink recording apparatus on account of the advantages of direct visibility and dry recording. They are used in technical and scientific and particularly in biological and medical diagnostic recording apparatus such as electrocardiographs and electro-encephalographs in order to record permanently and directly visibly the changes of physical values, converted where desired into amplifiable current or voltage fluctuations, occurring in the subject under examination.

Such recording apparatus includes a measuring instrument (of which there are many known types) for converting electric signals comprising voltage or current fluctuations into a visible deflection of an indicator, for example, a mild steel recording arm of the measuring instrument. In operation of the above recording apparatus, a strip-form recorder carrier of paper, plastic or metal foil, and also a strip form colour or pigment carrier of paper, plastic or metal having a colour or pigment layer, for example of carbon or carbon black, applied on one side and transferable upon contact, are traversed through a recording station by means, usually in the form of rollers, for holding, guiding, tensioning and retarding the record carrier and the pigment carrier by at least one electric motor. A base, which is slightly yieldable or unyieldable is disposed at the recording station and is preferably in the form of an edge extending perpendicularly both to the direction of movement of the record carrier and also to the recording arm in its position of rest, or of a slim roller. The record carrier and the pigment carrier, the layer of pigment facing the former, are passed between the base and the recording arm in directions which are inclined to one another, preferably at an obtuse or acute angle. The recording arm resiliently presses the record and pigment carriers together at the recording edge to effect transfer of pigment on to the record carrier to produce a recorded trace.

The degree of utilisation of pigment carrier in the previously proposed recording apparatus is generally very low since the pigment carrier must not be passed too slowly through the recording station. During recording, periods frequently occur during which the data or measurement being recorded deviates only slightly from a certain value, such as zero. During such a period the pigment layer on the pigment carrier may deteriorate substantially since the recording arm remains substantially stationary during this period. Hitherto it has been possible to avoid this by increasing the speed of traverse of the pigment carrier through the recording station, a feature which necessitated the accommodation of a comparatively large supply thereof in the recording apparatus.

An object of the present invention is, therefore, to reduce the consumption of pigment carrier to as low a rate as possible, even over long periods of recording, so as to reduce the frequency of the occasions when the supply of pigment carrier of such recording apparatus must be replaced by a new supply.

Another object of the present invention is to enable a small storage roller of pigment carrier to be accommodated so that the supply relay may be arranged directly adjacent the tip of the recording arm thereby facilitating substantially simultaneous visibility of the trace recorded on the record carrier of the movement of the recording arm.

A further object of the present invention is to increase the degree of utilisation of the layer of pigment on the pigment carrier and yet retain a desired quality of recording.

A still further object of the present invention is to reduce the possibility of the recording arm being dragged by the pigment carrier as the pigment carrier is traversed through the recording station, so as to avoid errors in deflection and zero position.

A specific object of the present invention is to vibrate the pigment carrier transversely in the plane of recording as the pigment carrier is traversed through the recording station so as to utilise a greater proportion of the pigment carrier.

Still further objects of the present invention will be apparent from the following detailed description when read in conjunction with the accompanying drawings.

Figure 2:
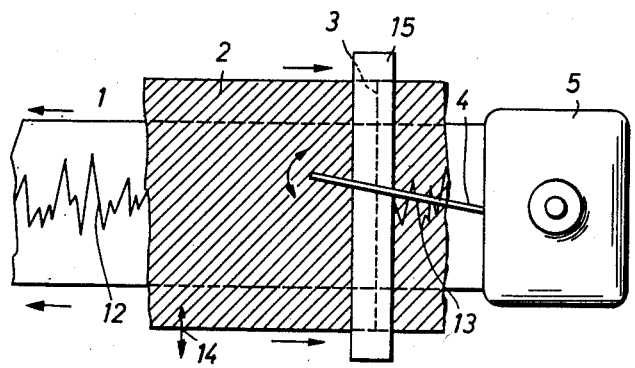

In the drawings:

FIG. 1 is a perspective diagrammatic view of a recording apparatus according to one embodiment of the invention, FIG. 2 is a detailed plan view of part of the apparatus of FIG. 1, and FIGS. 3 and 4 are detailed plan views similar to FIG. 2 but illustrating second and third embodiments of the invention.

According to the present invention, recording apparatus for directly registering variations in an electric current or voltage, comprises a recording base, preferably in the form of a recording edge or roller, disposed at a recording station, a measuring instrument for receiving said current or voltage variations and having an indicator in the form of a recording arm movable across said base responsively to said variations, means for supporting, traversing and tensioning a strip-form record carrier between said recording base and said recording arm, and means for supporting, traversing and tensioning a strip-form pigment carrier also between said recording base and said recording arm, with a pigmented face of said pigment carrier facing said record carrier, and for imparting to said pigment carrier at said recording station a vibratory movement in the plane of recording.

By imparting a vibratory movement to the pigment carrier, the extent of the trace formed on the pigment carrier by removal of pigment therefrom upon transfer can be very much increased. The trace on the pigment carrier is formed by the vectorial sum of the deflections of the recording arm and the vibrations of the pigment carrier. Thus a larger surface of the pigment carrier can be used for a given recorded trace on the record carrier, enabling the speed of traverse of the pigment carrier and the supply thereof in the recording apparatus to be reduced.

Furthermore, the vibration of the pigment carrier in the plane of recording, i.e. parallel to the recording base, or in a plane parallel to the recording edge and the recording arm, particularly, in the case of a sufficiently high frequency of vibration, has such effect that the adhesive friction between the pigment carrier and the recording arm, despite the necessary pressure still exerted, is practically removed or, in any case, only the much less sliding friction is left. If, in fact, the frequency of vibration is above the natural frequency of the recording system, the inertia of the recording arm is so great relative to the high speed of vibration that the inertia forces substantially completely prevent the dragging and adhesion to the pigment carrier and the latter slides continuously to and fro under the recording arm without the sliding friction being converted into greater adhering friction. Therefore, the recording arm can always occupy the correct angular position corresponding to the signal being recorded. The feature of the present invention, therefore, in a few words, leads to the removal of a kind of mechanical hysteresis.

An important feature is that the vibration frequency should vary greatly from the natural frequency of the recording system, preferably be much higher. In the usual fast recording apparatus particularly, for biological and medical purposes, the harmonic components of the fluctuations to be measured, for example up to 150 cycles per second, should be a substantially true reproduction, and it is preferable to select a frequency of vibration of about 200 to 300 cycles per second. Vibration amplitudes of only 0.1 to 0.5 mm. have been found to be sufficient.

If a higher maximum speed is provided for the proposed vibration of the pigment carrier, compared with the expected fastest deflections of the recording arm, a pigment transfer can in any case be made along a much longer track which sweeps over the pigment carrier transversely in a jaggered or curved line than if no vibration were used. A suitable ratio between the frequencies of the measuring impulses or signals to be recorded and the frequency of the vibration can be obtained from case to case by suitable adjustment of the frequency of vibration of the pigment carrier.

So that a transverse vibratory movement of the pigment carrier, according to the invention does not lead to the recording arm sliding over the edge of the pigment carrier in the end positions of the vibrations, the amplitude of the transverse vibratory movement must not be greater than the difference between half the pigment carrier width and the expected maximum amplitude of the impulses to be measured. The higher the frequency of vibration, the smaller its amplitude can be by which a considerable extension of the trace reproduced on the pigment carrier is obtained. If, in accordance with a preferred embodiment, the vibration is much quicker than a deflection of the recording arm, the vibration amplitude can be reduced to a few tenths of a millimetre. If very rapid deflections of the recording arm are to be expected, so that the vibration could be given an even higher frequency of speed only with a very large cost for technical reasons, then, conversely, the vibration speed of the pigment carrier can also be less than the speed of movement of the recording arm so long as the former always remains greater than the speed of traverse of the pigment carrier. With a low frequency of vibration a comparatively large vibration amplitude is preferably selected, however, provided the other dimensions and the maximum deflections of the recording arm to be expected permit.

The frequency of the vibration of the pigment carrier, which in particular may be purely of sinusoidal form but can also be of saw tooth form, can be derived from the feed or the drive of the strip-form record carrier, for example, through a lateral slide guide for the driving rollers or from the main frequency, by means of a suitable conventional "vibration drive." An electromagnet connected to a saw tooth voltage generator would produce such a movement.

The object of the present invention may be achieved not only by vibration in a straight line, but also by an arcuate swinging movement of the pigment carrier in the plane of recording. The vibration of the pigment carrier can be effected either exclusively by the pigment carrier or jointly with its guide-, drive- or brake-rollers or finally jointly with the entire assembly which is required for the pigment carrier. So that the recording arm is not dragged along during the transverse vibration, it is preferable to provide between the pigment carrier and the recording arm, a stationary thin protective strip of a pliable but sufficiently strong material such as a plastic foil.

In the embodiment of recording apparatus shown in FIGS. 1 and 2, a strip-like record carrier 1 is traversed along a path passing over a recording base constructed as a recording edge 3, and situated at a recording station. The record carrier 1 is traversed along its path by a pair of driving rollers 6, coupled to a motor 6a and is retarded by a pair of braking rollers 7 for the purpose of tensioning and sharply bending the carrier over the recording edge 3. A pigment or colour carrier 2, also in strip form, such as a strip of carbon paper, is traversed along a path passing over the record carrier 1 at the recording station. The pigment carrier is traversed at a lower speed than, and in the opposite direction to, the record carrier. If preferred the pigment carrier may alternatively be traversed between the record carrier and the recording edge. A motor 8a serves to rotate a driving or winding roller 8 for traversing the pigment carrier along its path. A recording arm 4 is disposed at the recording station above the edge 3 and is deflected under the action of measuring impulses, by an instrument 5. A pigment trace can thereby be produced on the record carrier at the edge 3 so that the trace is recorded according to a right-angled system of co-ordinates.

According to the present invention the pigment carrier 2 is rhythmically vibrated in its plane transversely to its direction of traversing. In the embodiment shown in FIGS. 1 and 2 this is produced by any conventional reciprocatory or vibratory drive, which is represented by the motor 10 and engages with a supply roller 9 for the pigment carrier. The supply roller 9 slides on a spindle 11 axially backwards and forwards with the vibration frequency and vibrates the pigment carrier strip 2. The amplitude of vibration may amount, for example, to 0.2 to 0.4 mm. In order to prevent the recording arm 4 vibrating in sympathy, a thin yielding, but sufficiently wear-resistant, protective strip 15 such as a thin plastic foil, is located undisplaceably between said recording arm 4 and the pigment carrier and longitudinally of the recording edge.

The direction of the vibratory movement of the record carrier 2 is indicated by a double-headed arrow 14. The movement of the recording arm 4 leaves behind on the pigment carrier 2 a trace 13 formed by pigment removed from the pigment carrier which trace represents a superposition of the measuring impulse oscillations on the vibration.

The embodiment shown in FIG. 3 is similar to that of FIGS. 1 and 2 except that a pigment carrier 2a is traversed substantially perpendicularly to the path of a record carrier 1 over a recording edge (not seen in FIG. 3) so that in itself the pigment carrier can be relatively narrow. The pigment thereon available for transfer would, however, be only a straight line without a transverse vibration in a direction of the double-headed arrow 14a, that is to say perpendicularly to the recording edge so that for particularly rapid deflections of the recording arm 4, the arm would sweep several times over the same portions of the pigment carrier. In that case, owing to the deterioration of the pigment, the recording 12 would be defective. Due to the vibration applied by drives 10a, 10b to rollers journalled on spindles 11a, 11b and supporting the pigment carrier 2a, the entire width of the pigment carrier can be properly utilised even if overlapping of portions of the pigment carrier from which the pigment is transferred does occur. A motor 8a drives the winding-on roller 8 of the pigment carrier. Under the action of the vibration drives 10a, 10b the rollers slide on their spindles 11a and 11b to and fro and move the pigment carrier 2a at the same time. The portions of the pigment carrier from which pigment is transferred are indicated at 13a. In the embodiment of the invention of FIG. 3, the supply of pigment carrier in the apparatus can be kept very small.

In FIG. 4 an embodiment of a recording for dry pigment recording, which is generally more favourable in this respect and in which a pigment carrier 2b runs not quite perpendicularly but at steep incline to the path of a record carrier 1 over a recording edge 3. The acute angle relative to the direction of the recording edge is selected in such manner that a recording arm 4 still does not slide over the edge of the pigment carrier with the maximum deflections to be expected. In itself, this arrangement of the pigment carrier can partially achieve the object of the invention even without vibration, since even if travel is slow the entire width of the pigment carrier can be utilised and close traces are produced thereon in succession. The recording arm cannot remain in the same place on the pigment carrier. Nevertheless, the efficiency can still be further increased even in this case by a transverse vibration in the direction of the double-headed arrow 14b even if overlapping of the tracing on the pigment carrier may occur here and there. The embodiment of FIG. 4 is otherwise the same as in the embodiment shown in FIG. 3.

According to the ratio of the frequency of the vibratory movement of the pigment on colour carrier to that of the deflection of the recording arm and also the ratio of the amplitudes thereof, various shapes of trace may be produced on the pigment carrier by the superposition of the two movements. In any case, the pigment layer of the pigment carrier can be more efficiently utilised by the present invention. Furthermore, due to the double movement, the pigment transfer is generally improved. A smaller supply of pigment carrier is sufficient and this is a feature which is desirable when, directly after the production of the recorded trace the latter is to be visible substantially simultaneously with the movement of the recording arm.

I claim:

1. Recording apparatus for directly recording variations in electrical voltages at a recording station on a strip form record carrier comprising a recording base disposed at said recording station, measuring means responsive to the variations in the electrical voltages, said means including a recording arm movable across said recording base, means for supporting, traversing and tensioning the strip form record carrier between said recording base and said recording arm, a strip form pigment carrier having a pigmented face, means for supporting, traversing, and tensioning the strip form pigment carrier also between said recording base and said recording arm with the pigmented face of said pigment carrier facing said record carrier and means for imparting to said pigment carrier at said recording station a vibratory motion in the plane of recording, said vibratory motion having a frequency of at least two hundred cycles per second and an amplitude no greater than 0.5 millimeter, being applied continuously during the time the variations in electrical voltages are being recorded in order to minimize the adhesive friction between said record arm and said pigment carrier.

2. Recording apparatus for directly recording variations in electrical voltages on a strip form carrier at a recording station comprising, a recording base disposed transversely at said recording station, measuring means responsive to the variations in the electrical voltages, said means including a recording arm moveable transversely at said record recording station across said recording base, said arm being resiliently biased towards said recording base, first driving and braking rollers for supporting, traversing and tensioning the strip form record carrier along a longitudinal path through said recording station between said recording base and said recording arm, a strip form pigment carrier having a pigmented and an unpigmented face, second driving and braking rollers for supporting, traversing and tensioning the strip form carrier along a path also between said recording base and said recording arm with the pigmented face of said pigment carrier facing said record carrier, electric motor means for rotating said first and second driving rollers and means for imparting a vibratory movement to said pigment carrier at said recording station in the plane of recording, said vibratory motion having a frequency of at least two hundred cycles per second and an amplitude not greater than 0.5 millimeter, and being applied continuously during the time the variations in electrical voltages are being recorded in order to minimize the adhesive friction between said record arm and said pigment carrier.

3. Recording apparatus for directly recording variations in electrical voltages on a strip form record carrier at a recording station comprising a recording base disposed at said recording station, measuring means responsive to the variations in the electrical voltages, said means including a recording arm movable across said recording base, first driving and braking rollers for supporting, traversing and tensioning the strip form record carrier along a path between said recording base and said recording arm, a strip form pigment carrier having a pigmented face, second driving and braking rollers for supporting, traversing and tensioning the strip form pigment carrier along a path also between said recording base and said recording arm with the pigmented face of said pigment carrier facing said record carrier, driving means for rotating said first driving rollers and said second driving rollers and means for imparting to said second driving rollers a vibratory movement whereby said pigment carrier at said recording station is provided with a vibratory movement in the plane of recording, said vibratory movement being applied continuously during the time the variations in electrical voltages are being recorded in order to minimize the adhesive friction between said record arm and said pigment carrier.

4. Apparatus as claimed in claim 3 wherein said recording base includes a recording edge disposed transversely to said record carrier path at said record station.

5. Apparatus as claimed in claim 3 comprising means for adjusting the speed of vibratory movement of said pigment carrier at said recording station, said pigment carrier having a maximum speed of vibratory movement greater than the speed of the fastest recording movement of said recording arm.

6. Apparatus as claimed in claim 3 comprising means for adjusting the speed of vibratory movement of said pigment carried at said record station and means for adjusting the speed of traversing of said pigment carrier through said record station, whereby the maximum vibratory speed of said pigment carrier at said recording station is greater than the speed of traversing of said pigment carrier and less than the speed of the fastest recording movement of said recording arm.

7. Apparatus as claimed in claim 3 wherein said means for imparting said vibratory movement is adapted to provide a saw tooth vibration.

8. Apparatus as claimed in claim 3 comprising a main electrical supply having a determinable frequency, said means for imparting a vibratory movement being adapted to vibrate said pigment carrier in response to said frequency.

9. Apparatus as claimed in claim 3 wherein said vibratory motion has a frequency of at least two hundred cycles per second and an amplitude no greater than 0.5 millimeter.

References Cited in the file of this patent

UNITED STATES PATENTS

| | | |
|---|---|---|
| 626,848 | Wills | June 13, 1899 |
| 1,564,560 | Grisdale | Dec. 8, 1925 |
| 2,156,289 | Hoy | May 2, 1939 |
| 2,500,907 | Stead | Mar. 14, 1950 |
| 2,695,211 | Guttwein et al. | Nov. 23, 1954 |
| 2,703,269 | Wood | Mar. 1, 1955 |
| 2,939,757 | MacDonald et al. | June 7, 1960 |

FOREIGN PATENTS

| | | |
|---|---|---|
| 279,775 | Germany | Mar. 1, 1914 |
| 312,997 | Switzerland | Apr. 30, 1956 |
| 794,659 | Great Britain | May 7, 1958 |